(12) United States Patent
Childress

(10) Patent No.: US 11,880,797 B2
(45) Date of Patent: Jan. 23, 2024

(54) WORKFORCE SENTIMENT MONITORING AND DETECTION SYSTEMS AND METHODS

(71) Applicant: Macorva Inc., Bellaire, TX (US)

(72) Inventor: Nathan Childress, Bellaire, TX (US)

(73) Assignee: Macorva Inc., Bellaire, TX (US)

( * ) Notice: Subject to any disclaimer, the term of this patent is extended or adjusted under 35 U.S.C. 154(b) by 0 days.

(21) Appl. No.: 16/748,225

(22) Filed: Jan. 21, 2020

(65) Prior Publication Data

US 2020/0234208 A1 Jul. 23, 2020

Related U.S. Application Data

(60) Provisional application No. 62/795,746, filed on Jan. 23, 2019.

(51) Int. Cl.
| | |
|---|---|
| *G06Q 10/0639* | (2023.01) |
| *G06F 16/28* | (2019.01) |
| *G06Q 10/105* | (2023.01) |
| *H04L 9/10* | (2006.01) |
| *H04L 9/40* | (2022.01) |

(52) U.S. Cl.
CPC ....... *G06Q 10/0639* (2013.01); *G06F 16/285* (2019.01); *G06Q 10/06398* (2013.01); *G06Q 10/105* (2013.01); *H04L 63/102* (2013.01)

(58) Field of Classification Search
CPC .................. G06Q 10/0639; G06Q 10/06398
See application file for complete search history.

(56) References Cited

U.S. PATENT DOCUMENTS

| | | | | |
|---|---|---|---|---|
| 7,778,865 | B1* | 8/2010 | Kane | G06Q 10/06398 |
| | | | | 705/7.42 |
| 10,373,354 | B2* | 8/2019 | Barosi | G06T 11/206 |
| 2002/0035506 | A1* | 3/2002 | Loya | G06Q 10/1057 |
| | | | | 705/14.19 |
| 2003/0004778 | A1* | 1/2003 | Gareau | G06Q 30/0203 |
| | | | | 705/7.32 |
| 2003/0101091 | A1* | 5/2003 | Levin | G09B 7/00 |
| | | | | 705/7.42 |
| 2004/0030566 | A1* | 2/2004 | Brooks Rix | G06Q 10/1053 |
| | | | | 705/321 |

(Continued)

FOREIGN PATENT DOCUMENTS

WO 2020154505 A1 7/2020

OTHER PUBLICATIONS

Eckerson, Performance Management Strategies How to Create and Deploy Effective Metrics, First Quarter 2009 TDWI (The Data Warehousing Institute) Best Practices Report (Year: 2009).*

(Continued)

*Primary Examiner* — Andre D Boyce
(74) *Attorney, Agent, or Firm* — Polsinelli PC

(57) ABSTRACT

Exemplary implementations may provide a workforce sentiment and structure descriptions. A survey management tool can solicit and retrieve ratings data from employees via a survey. The received ratings can be aggregated and scaled according to employee ratings to identify and adjust for the impact of influential employees. An organizational chart may be updated based on the survey results and users may navigate the updated organizational chart to review employee ratings.

20 Claims, 13 Drawing Sheets

(56) References Cited

U.S. PATENT DOCUMENTS

| | | | |
|---|---|---|---|
| 2004/0220825 A1* | 11/2004 | Schwerin-Wenzel | ................... G06Q 10/103 705/7.37 |
| 2005/0108043 A1* | 5/2005 | Davidson | ............... G06Q 10/10 705/7.36 |
| 2006/0015393 A1* | 1/2006 | Eisma | ........... G06Q 10/063112 705/7.14 |
| 2006/0031115 A1* | 2/2006 | Eisma | ........... G06Q 10/063112 705/7.14 |
| 2006/0277205 A1* | 12/2006 | Song | ........................ G06N 5/02 |
| 2007/0179945 A1* | 8/2007 | Marston | ............... G06Q 10/107 |
| 2008/0201159 A1* | 8/2008 | Gabrick | ................. G06Q 10/10 705/1.1 |
| 2009/0276296 A1 | 11/2009 | Spriegel | |
| 2009/0292590 A1 | 11/2009 | Zaidi | |
| 2009/0319344 A1 | 12/2009 | Tepper et al. | |
| 2010/0042574 A1 | 2/2010 | Dewar | |
| 2011/0161139 A1* | 6/2011 | Maheshwari | .......... G06Q 10/06 705/7.42 |
| 2012/0078804 A1 | 3/2012 | Scarborough et al. | |
| 2013/0204675 A1 | 8/2013 | Dobell | |
| 2013/0212479 A1* | 8/2013 | Willis | .................... G06Q 10/10 715/736 |
| 2014/0164073 A1* | 6/2014 | Mosley | ............ G06Q 10/06398 705/7.42 |
| 2015/0025943 A1* | 1/2015 | Schmidt | .......... G06Q 10/06393 705/7.39 |
| 2016/0371625 A1* | 12/2016 | Mosley | ............ G06Q 10/06398 |
| 2018/0189691 A1 | 7/2018 | Oehrle et al. | |
| 2018/0330303 A1* | 11/2018 | Mosley | ............... G06F 3/04817 |

OTHER PUBLICATIONS

International Search Report and Written Opinion; PCT Application No. PCT/US2020/014797; dated Apr. 23, 2020.

* cited by examiner

Department Report

Marketing ▼    Q3 2018 vs Q3 2017 ▼

Inter-Department Ratings   710

| Other Department | They Rate Marketing | | Marketing Rates Them | |
|---|---|---|---|---|
| | Q3 2018 | Q2 2018 | Q3 2018 | Q2 2018 |
| Company Average | 8.0 | 7.1 | 8.0 | 7.1 |
| Marketing | 8.3 | 7.7 | 8.3 | 7.7 |
| Sales | 7.6 | 8.4 | 7.6 | 8.4 |
| R&D | 7.4 | 7.2 | 7.4 | 7.2 |
| Operations | 7.6 | 9.5 | 7.6 | 9.5 |
| Manufacturing | | 7.6 | | 7.6 |
| Human Resources | 7.8 | 9.3 | 7.8 | 9.3 |

Some values may not be reported to ensure anonymity.

Department Statistics   720

| | Q3 2018 | Q2 2018 | % Change |
|---|---|---|---|
| Size | 670 | 631 | 6.2% |
| Engagement | 74.2% | 71.2% | 4.2% |
| Happiness | 65.3% | 60.1% | 8.7% |
| Completion | 43.3% | 57.9% | -25.2% |
| Average intradepartment rating | 7.2 | 7.2 | 0% |

FIG. 7A

ABIO Report Table 902

[All Departments ▼] — 906

| ID ▼ | Full Name ▼ | Department ▼ — 908 | Overall Score ▼ 910 | n 910B | Above Score ▼ 912 | n 912B | Below Score ▼ 914 | n 914B | Inside Score ▼ 916 | n 916B | Outside Score ▼ 918 | n 918B |
|---|---|---|---|---|---|---|---|---|---|---|---|---|
| 120 | 904 Johnny Appleseed | Marketing | 7.2 | >5 | 7.7 | >5 | insig. | <5 | 8.5 | >75 | 9.5 | >5 |
| 120 | Johnny Appleseed | Marketing | 9.5 | >75 | 8.5 | >75 | 9.5 | >75 | 9.5 | >75 | 7.7 | >5 |
| 120 | Johnny Appleseed | Marketing | 7.2 | >5 | 7.7 | >5 | insig. | <5 | 8.5 | >75 | 9.5 | >5 |
| 120 | Johnny Appleseed | Marketing | 9.5 | >75 | 8.5 | >75 | 9.5 | >75 | 9.5 | >75 | 7.7 | >5 |
| 120 | Johnny Appleseed | Marketing | 7.2 | >5 | 7.7 | >5 | insig. | <5 | 8.5 | >75 | 9.5 | >5 |
| 120 | Johnny Appleseed | Marketing | 9.5 | >75 | 8.5 | >75 | 9.5 | >75 | 9.5 | >75 | 7.7 | >5 |
| 120 | Johnny Appleseed | Marketing | 7.2 | >5 | 7.7 | >5 | insig. | <5 | 8.5 | >75 | 9.5 | >5 |
| 120 | Johnny Appleseed | Marketing | 9.5 | >75 | 8.5 | >75 | 9.5 | >75 | 9.5 | >75 | 7.7 | >5 |
| 120 | Johnny Appleseed | Marketing | 7.2 | >5 | 7.7 | >5 | insig. | <5 | 8.5 | >75 | 9.5 | >5 |
| 120 | Johnny Appleseed | Marketing | 9.5 | >75 | 8.5 | >75 | 9.5 | >75 | 9.5 | >75 | 7.7 | >5 |

Page 1 2 3 4 5 ... 25 26 27

[Print Full Table]
[Print Without Highlights]

FIG. 9

WORKFORCE SENTIMENT MONITORING AND DETECTION SYSTEMS AND METHODS

TECHNICAL FIELD

Embodiments of the present disclosure are generally related to systems and methods for automatically determining and monitoring workplace cohesion.

BACKGROUND

Workplace cohesion can have an immediate and strong impact on workplace productivity. In many circumstances, it is difficult or impossible to determine sentiment among employees of a workforce. For example, employees may be unwilling to truthfully share their impressions of each other or it may be challenging to fully interview all employees within a workplace, department, or working group. Where an employee does provide feedback relevant to workplace cohesion, it is often difficult to distinguish a "signal" within the "noise." That is to say, the provided feedback may be skewed by various latent biases of the employee. When workplace cohesion cannot be determined, incompatible workers can be placed on the same team, incompatible or inadequate management practices may continue unabated, and various other deteriorative phenomena within a workplace may occur due to a dissatisfied workforce.

In some cases, surveys may be distributed to employees in an attempt to determine employee sentiment. However, distributing and processing surveys adequately across a workforce to obtain a useful sample is often challenging. While current survey methods track and aggregate feedback among all employees belonging to a department, age group, etc., no survey assigns ratings to individuals in the organization. In addition, interpreting individual coworker rating data can be difficult if not impossible for a human as some employees may provide more useful data than other employees due to employee personality, placement within the hierarchy of the company, level of interaction with coworkers, etc. As a result, ratings applied to individual employees and also ratings of other employees (i.e., coworkers) are most useful when interpreted within a context including all employee ratings within the workforce. In order to achieve said context, a way of distributing surveys, monitoring survey completion, interrelating survey results, processing survey results, and presenting the results in an intuitive and actionable manner may be needed.

It is with these observations in mind, among others, that aspects of the present disclosure were concerned and developed.

SUMMARY

A method for determining employee sentiment ratings includes receiving ratings data, the ratings data associated with one or more employees and responsive to a survey, aggregating the ratings data to generate adjusted ratings for the one or more employees, generating a report based on the generated adjusted ratings, and generating a navigable interface including the generated report, the navigable interface accessible to an authorized user.

The method may further include receiving an organizational (org) chart, visually associating one or more portions of the org chart with the generated adjusted ratings, and wherein the generated navigable interface further includes the org chart.

The method may further include receiving survey parameters, the survey parameters identifying the one or more employees to survey, identifying a mismatch between the org chart and the identified one or more parameters, the mismatch including one of an employee not included in the org chart or an employee of the org chart not included among the identified one or more employees, and prompting the authorized user to specify a reason for the mismatch.

The method may further include generating respective scores for each of the one or more employees, each respective score based on one or more of ratings received from coworkers organizationally above a respective employee of the one or more employees, ratings received from coworkers organizationally below the respective employee, ratings received from coworkers within a shared department of the respective employee, or ratings received from coworkers in different departments than that of the respective employee, and categorizing the one or more employees based on the respective scores, wherein the navigable interface further includes one of the respective scores or the categorized one or more employees.

The method may further include grouping the adjusted ratings data into department groups, aggregating the grouped adjusted ratings data based on the department groups, and generating inter-departmental data based on the aggregated grouped adjusted ratings data, wherein the navigable interface further includes the inter-departmental data.

The method may further include generating a set of weight values for the one or more employees, the weight values corresponding to the ratings data associated with the one or more employees, and generating the adjusted ratings by weighting the ratings data according to the set of weight values.

The method may further include generating a projected performance for the one or more employees based on the adjusted ratings.

A system for determining employee sentiment ratings includes one or more processors, and a memory including instructions for the one or more processors to receive ratings data, the ratings data associated with one or more employees and responsive to a survey, aggregate the ratings data to generate adjusted ratings for the one or more employees, generate a report based on the generated adjusted ratings, and generate a navigable interface including the generated report, the navigable interface accessible to an authorized user.

The system may further include instructions to receive an organizational (org) chart, visually associate one or more portions of the org chart with the generated adjusted ratings, and wherein the generated navigable interface further includes the org chart.

The system may further include instructions to receive survey parameters, the survey parameters identifying the one or more employees to survey, identify a mismatch between the org chart and the identified one or more parameters, the mismatch including one of an employee not included in the org chart or an employee of the org chart not included among the identified one or more employees, and prompt the authorized user to specify a reason for the mismatch.

The system may further include instructions to generate respective scores for each of the one or more employees, each respective score based on one or more of ratings received from coworkers organizationally above a respective employee of the one or more employees, ratings received from coworkers organizationally below the respective employee, ratings received from coworkers within a shared department of the respective employee, or ratings received from coworkers in different departments than that of the respective employee, and categorize the one or more employees based on the respective scores, wherein the navigable interface further includes one of the respective scores or the categorized one or more employees.

The system may further include instructions to group the adjusted ratings data into department groups, aggregate the grouped adjusted ratings data based on the department groups, and generate inter-departmental data based on the aggregated grouped adjusted ratings data, wherein the navigable interface further includes the inter-departmental data.

The system may further include instructions to generate a set of weight values for the one or more employees, the weight values corresponding to the ratings data associated with the one or more employees, and generate the adjusted ratings by weighting the ratings data according to the set of weight values.

The system may further include instructions to generate projected performance for the one or more employees based on the adjusted ratings.

A non-transitory computer readable medium storing instructions that, when executed by one or processors, cause the one or more processors to receive ratings data, the ratings data associated with one or more employees, and responsive to a survey, aggregate the ratings data to generate adjusted ratings for the one or more employees, generate a report based on the generated adjusted ratings, and generate a navigable interface including the generated report, the navigable interface accessible to an authorized user.

The non-transitory computer readable medium may further store instructions to receive an organizational (org) chart, visually associate one or more portions of the org chart with the generated adjusted ratings, and wherein the generated navigable interface further includes the org chart.

The non-transitory computer readable medium may further store instructions to receive survey parameters, the survey parameters identifying the one or more employees to survey, identify a mismatch between the org chart and the identified one or more parameters, the mismatch including one of an employee not included in the org chart or an employee of the org chart not included among the identified one or more employees, and prompt the authorized user to specify a reason for the mismatch.

The non-transitory computer readable medium may further store instructions to generate respective scores for each of the one or more employees, each respective score based on one or more of ratings received from coworkers organizationally above a respective employee of the one or more employees, ratings received from coworkers organizationally below the respective employee, ratings received from coworkers within a shared department of the respective employee, or ratings received from coworkers in different departments than that of the respective employee, and categorize the one or more employees based on the respective scores, wherein the navigable interface further includes one of the respective scores or the categorized one or more employees.

The non-transitory computer readable medium may further store instructions to group the adjusted ratings data into department groups, aggregate the grouped adjusted ratings data based on the department groups, and generate inter-departmental data based on the aggregated grouped adjusted ratings data, wherein the navigable interface further includes the inter-departmental data.

The non-transitory computer readable medium may further store instructions to generate a set of weight values for the one or more employees, the weight values corresponding to the ratings data associated with the one or more employees, generate the adjusted ratings by weighting the ratings data according to the set of weight values, and generate a projected performance for the one or more employees based on the adjusted ratings.

BRIEF DESCRIPTION OF THE DRAWINGS

FIGS. 7A-B illustrate example reporting interfaces for departments, according to embodiments of the present technology;

FIG. 9 illustrates an example reporting interface for a team, according to embodiments of the present technology;

DETAILED DESCRIPTION

Figure 1:
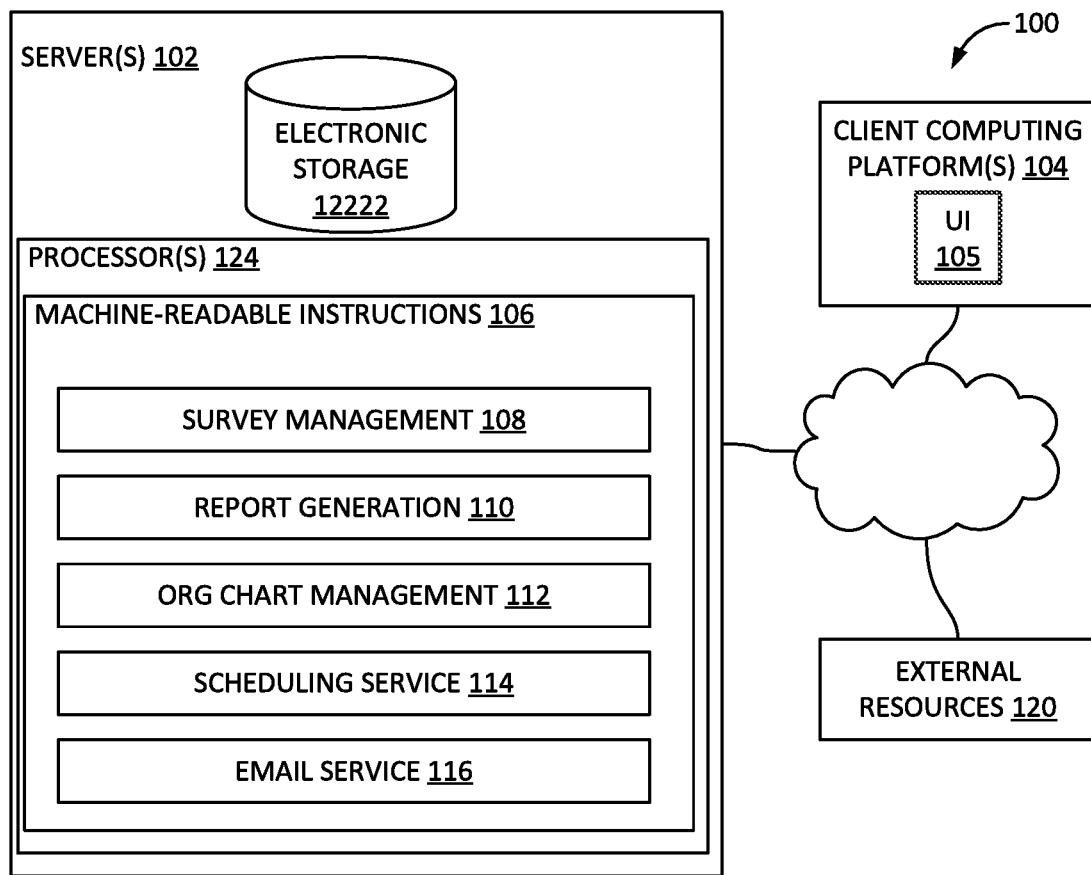
FIG. 1 illustrates a system architecture for monitoring and detecting employee sentiment, according to embodiments of the present technology.

One aspect of the present disclosure relates to a cloud computing based feedback and rating system provided over a web interface enabling employees to anonymously rate each other. As used in this disclosure, "employee" is understood to refer to any member of a workforce in any capacity; "supervisor" is understood to refer to any employee under whom other employees work and/or to whom other employees report; and, "coworker" refers to other employees within the same workforce as a referenced employee. Each employee (e.g., including supervisors, managers, executives, associates, etc.) may be given a rating which can be used to determine trends for each employee and/or aggregated trends across groups of employees (e.g., entire organization, department, workgroup, team, etc.).

Results of the determination may be displayed in an organizational chart ("org chart") depicting a structure and population of each employee within a company. As a result, employee sentiment across the organization can be ascertained, management is able to make informed decisions regarding promotions, demotions, raises, firings, and performance improvement plans, and Human Resources (HR) departments are able to quickly measure employee engagement across an entire organization. These decisions are typically made at the sole discretion of each supervisor, without collecting feedback from all relevant coworkers.

The employee sentiment, provided as actionable data via the displayed org chart interface, may be used for downstream processes. For example, determination of raises, applying strikes to a record, identification of candidates needing coaching, documentation of causes for termination, and identification of employees meriting termination can be based on the actionable data.

A survey may be provided (e.g., automatically) to employees (e.g., as a unique link to a web application, etc.) and provide a data intake for generating actionable data analytics. The survey can be conducted on either mobile or desktop devices. The data analytics may be as granular as a single employee or as aggregated as an entirety of the organization (e.g., company-wide), as well as by department, workgroup, team, etc. For example, if a company is divided into a sales division and an engineering division, and the engineering division is further divided into backend team and frontend team, then the analysis may be performed for the whole company, the sales division, the overall engineering division, the backend team of the engineering division, and/or the frontend team of the engineering division.

An authorized user, such as an employer or the like, can log in to a web application and choose survey parameters. Survey parameters may include, for example and without imputing limitation, a survey start date, reporting frequency, survey availability duration, individual employees to survey, employee groups (e.g., workgroup, team, division, department, etc.), etc.

The web application may generate an org chart based on a provided org chart (e.g., by the company) and employee photographs. The authorized user can then visually explore the generated org chart to, for example, check for errors, etc. In some examples, where the generated org chart does not include employees from a previous survey, the authorized user may be prompted to provide correction or explanation (e.g., documentation) such as whether the respective employee retired, was fired, quit, etc. The correction and/or explanation can then be used for further trend analysis.

Employees, either indicated by the survey parameters or across the entire company by default, may receive an email allowing each respective employee to directly log into the web application and begin the survey. Employees may be asked overall company satisfaction questions and can see a list of coworkers within the same department who they may rate. In some examples, the employee may add additional coworkers to rate. As an employee adds additional coworkers, that same employee may be added to a list provided to each additional coworker. In some examples, the list can include the employee who rated the additional coworkers. In some examples, this list may obfuscate which employees rated which other employees by adding a random subset or an entire group or department to a list to be rated by a coworker based on the employee adding them.

A survey may be visible to different groups of users depending on its state. For example, the survey may be in "Pending" state after it has been configured and scheduled by an administrator, but is not yet open for responses. In the Pending state, the survey may be only visible to administrators. Once the administrator opens the survey, either by manually triggering it to be opened or by setting a timer for when the survey should open, the survey enters an "Open" state. In the Open state, all users may access and update their responses to the survey. Once a user completes a survey, the survey may enter an "Admin Review" state, and the responses may be sent to an administrator for review. If the administrator completes the review process and deems the survey valid, the survey then enters a "Closed" state and becomes available for all users to view. If the administrator considers the survey results invalid, the administrator may delete the survey, and the survey enters a "Deleted" state such that only certain administrators (e.g., "super" administrators, etc.) may view the surveys. In some examples, a survey that has been in the Closed state for a predetermined amount of time may be automatically changed to be in the Deleted state.

Generally, the survey may visually indicate that, on average, employees should rate coworkers an average score. For example, where the survey provides a ranking of 1-5, the average may be a three and the three may be located centrally along a sequence and/or be highlighted by distinctive selection size, font format, coloration, etc. Or, in other words, the survey may visually indicate that a surveyed employee should on average rate coworkers targeting an average of three. Additionally, the survey can include for each rated coworker a list of selectable attributes that are descriptive of that coworker such as, for example and without imputing limitation, "angry", "indecisive", "friendly", "creative", "uncooperative", "inflexible", "communicator", "reliable", "vindictive", "apathetic", "enthusiastic" "hard-working", "rude", "disorganized", "intelligent", and "team-oriented".

In some examples, the coworker ratings are based on how much an employee (responding to the survey) likes working with the respective coworker. The rating will typically be a combination of the friendliness of the coworker, willingness to help, and ability to accomplish work (i.e., as perceived by the employee). However, each employee may determine their own respective most important factors for each coworker to generate data indicating which employees are most effective at raising company satisfaction levels overall.

Additionally, employees, such as supervisors or managers, can view a full org chart during and after the survey via the web application. As a result, employees may visualize and interactively explore the company structure. While the survey is active, the employee can select coworkers to rate directly from the org chart. Further, as the survey progresses across all selected employees, authorized users may view how many have completed the survey (e.g., as a ratio, percentage complete, total surveys completed, etc.). In some examples, the generated org chart can be viewed by the authorized user and a percent of employees under each manager who have completed the survey can be viewed so that, for example, managers can be prompted to remind their employees to complete the survey.

The web application may include automated email processes associated with the survey. For example, while a survey is active for an employee, regular reminder emails may be sent to the employee prompting completion of the survey. Additionally, the employee may be sent an email soliciting a rating of additional coworkers identified by the system as candidate coworkers the employee may want to rate. Various video tutorials and reminders (e.g., explaining anonymity, surveying process, results, interface, etc.) may be integrated directly into the web application.

Additionally, the web application may automatically identify each employee's interactions with customers. The web application will then message the customers prompting them to complete a survey to provide feedback on the interactions. Results from these customer surveys may then be collected and incorporated into the feedback and rating system corresponding to each employee.

Once the survey is complete, either due to all (e.g., a quorum) surveyed employees completing the survey or as a result of the survey duration completing, actionable data analytics can be provided to, for example, senior leadership and HR. To protect privacy, data may be displayed only where a respective sample size is five or more (e.g., n>=5). For example, if an employee has been rated by only a single coworker, data regarding that employee may be withheld from being viewable. However, where an employee has been rated by five or more coworkers, a respective average rating and clustering of attributes selected for that employee may be provided to HR. In some examples, the sample size threshold may be different based on the type of data. For example, employee attribute data may have a threshold of 15 or more individual coworker ratings. Company-wide attributes and free comments may have a threshold of 100 or more individual employee ratings (or company size, etc.).

The actionable data analytics can include a score for each employee based on an aggregation of ratings that employee received through the survey. As part of the aggregation process, the ratings can be weighted, for example, based on the employee that provided them.

For example, every score may be initialized to a predetermined average (e.g., provided by the authorized user, etc.). For example, the predetermined average may be 8.0. Each rating to be aggregated into the score can be converted into a value of −1.0, −0.4, 0, +0.8, or +2.0 to result in a final score between 7.0 and 10.0 for each employee. The converted ratings may then be summed, and a weight may be applied to the summation based on the number of response. For example, and without imputing limitation, the table below may describe a weighting scheme based on n number of responses received.

TABLE 1

| Responses | Score Weight |
|---|---|
| n = [1, 5] | 0.3x |
| n = [6, 10] | 0.5x |
| n = [11, 20] | 0.7x |
| n = [21, 30] | 0.8x |
| n = [31, 50] | 0.9x |
| n > 50 | 1x |

Further, where 50 or more coworkers all rate an employee, a minimum score may be given to the employee (e.g., a converted value of −1.0). However, where 50 or more coworkers all rate an employee, a maximum score can be given to the employee (e.g., a converted value of +2.0).

Once ratings have been determined, employees receiving a maximum rating (e.g., a rating of 10.0), may be associated with an increased weight (e.g., a factor of 1x) for rating given by that employee to coworkers. In comparison, employees receiving a minimum rating (e.g., a rating of 7.0) may have their outgoing ratings reductively weighted (e.g., a factor of 0.25x). Employees between maximum and minimum ratings may likewise receive weightings along a corresponding sliding scale. To account for increased influence of employees substantially more well-received within the company than average (and, likewise, account for decreased influence of employees substantially less well received within the company than average), outgoing ratings for each employee can be recalculated based on the weighted values.

Other scores reflective of overall workforce trends can also be calculated. For example, a happiness score can be calculated based on a scale ranging from a "100%" indicating approximately 100% of employees rating the company "5" on the survey to a "0%" indicating approximately 100% of employees rating the company a "1". Employee engagement can be calculated based on a percentage of users who responded to the survey and/or rated the company a "4" or above. In some examples, company comparisons can be conducted by the web application to provide insight as to, for example and without imputing limitation, engagement and happiness scores of the company in comparison to other companies of comparable location, industry, size, etc. Further, the survey may include plain text fields for employees to provide additional comments and the like. The plain text results may be summarized with a list of comments and/or word cloud, which may limit the word/comment display to groups of more than 50 employee surveys to preserve anonymity, etc.

Survey results and actionable data analytics, such as the score and/or individual ratings, can be provided to varying degree to defined groups within a company. For example, each employee can see anonymized ratings and/or rating(s) over time as well as what attributes other employees have assigned to them. Employees may also see ratings received from different coworker groupings such as, for example and without imputing limitation, coworkers above the employee (e.g., managers), coworkers below the employee (e.g., coworkers who report to the employee), inside coworkers (e.g., coworkers within the same department as the employee), and outside coworkers (e.g., coworkers in different departments than the employee), sometimes referred to as ABIO scores.

The ABIO scores can be used to automatically identify employee types and the like. Generally, the employee types refer to a grouping of employees by behavior such as personality, workstyle, performance, and/or other factors that may be useful for appraising an employee. For example, an employee who has an "Above" rating averaging to 8.0 and "Below" and "Outside" ratings each respectively averaging out to 8.7 or higher may be automatically labeled as a "Silent Superstar" because the extent of the employee contributions may not be fully known by those above them.

In some examples, an employee, such as a supervisor for example, can also see the ratings of coworkers who report to that respective employee (e.g., members of a team for which the supervising employee is responsible, etc.). Ratings for other coworkers (e.g., lateral supervisors or managers hierarchically above the supervisor, etc.) may be hidden from the employee. As a result, only a company chief executive officer (CEO) or equivalent may be able to view the ratings of every employee within the company.

The employee may view ratings of coworkers via the navigable org chart or by a list interface. The employee can automatically filter by employee type when viewing coworker ratings. For example, a manager may filter by "Silent Superstar" to identify which employees are promising and which supervisors may need additional coaching. In another example, an employee may filter according to overall high ratings or overall low ratings and the like. Additionally, an employee (e.g., a manager, etc.) can view a percentage indicating how many coworkers below them has completed the survey.

Further, based on the survey results and actionable data analytics, data can be aggregated to automatically generate reports for particular employee groups. In some examples, a rating can be generated for an entire department, which can be treated substantially similarly to an individual employee (e.g., with ratings given by department members and ratings received by individual department members and/or the department as a whole). Further, scaling factors (as discussed above) can be applied or reapplied to the abstracted department and/or individual.

For example, department heads, HR, and administrators may receive a report including aggregated ratings indicating how each department likes working with employees of other departments, internal employee satisfaction levels as either a raw value or relative to other departments, perception indicator of a selected department from other departments either raw or relative to other departments, engagement level and completion rate of employees for each department, which employees work well with each department (e.g., a VP of an engineering department is rated very highly by more than 50 people in a purchasing department, etc.), which employees work poorly with each department (e.g., a VP of a research and development department is rated poorly by more than 20 people in an accounting department, etc.). Aggregating individual data into larger groups enables corporate issues to be identified and addressed for department-wide cooperation levels.

In some examples, certain reports or report components may only be available to, for example, the CEO and/or designated HR representatives. For example, the certain reports or report components may include, without imputing limitation, a graph of average employee score, average number of responses, and/or average happiness as a function of salary (e.g., in order to understand efficacy of the company at paying the most liked employees higher salaries, etc.), an average overall company ratings for all employees, and ratings related to employees who have been fired, laid off, or have resigned (e.g., ratings of their managers, etc.).

These and other features, and characteristics of the present technology, as well as the methods of operation and functions of the related elements of structure, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

FIG. 1 is an example system 100 for generating actionable data analytics from an automated survey. System 100 may include one or more servers 102 having an electronic storage 122 such as a database or other memory system and one or more processors 124 for performing machine-readable instruction 106 to generate the actionable data analytics.

Machine-readable instructions 106 can include a variety of components for performing specific actions or processes in performing automated surveys, managing the surveys, storing and processing data produced by the surveys, and various other functions as may be apparent to a person having ordinary skill in the art. A survey management component 108 can perform, manage, and prepare a survey for users to respond to via client computing platforms 104. Client computing platforms may receive and/or generate a user interface (UI) 105 for various operations such as creating a survey, reviewing survey results, responding to a survey, etc.

A report generation component 110 may access survey results from survey management 108 or from electronic storage 122 in order to generate reports which may be reviewed by users via client computing platforms 104 or provided to external resources 120 (e.g., such as downstream APIs and the like). The external resources 120 may use the survey results, for example and without imputing limitation, to determine a probability that an employee would perform well if promoted, or determine if an employee is at high risk for disciplinary action. An org chart management component 112 receives org charts from users and produces navigable org charts associated with data from survey management 108, report generation 110, or electronic storage 122. Further, org chart management 112 can update produced org charts according to survey management 108 operations by, for example and without imputing limitation, proposing optimizations to the org chart to improve team structure, or identifying new employees (e.g., new hires) or employees that are no longer surveyed (e.g., employee terminations/resignations). A scheduling service 114 may receive scheduling instructions from client computing platforms 104 or external resources 120 and may enforce received schedules such as performing a survey at regular time intervals or at specified times. An email service 116 can perform email operations supporting the other components such as sending out survey notices, survey links, generated reports, org charts, and the like.

Figure 2:
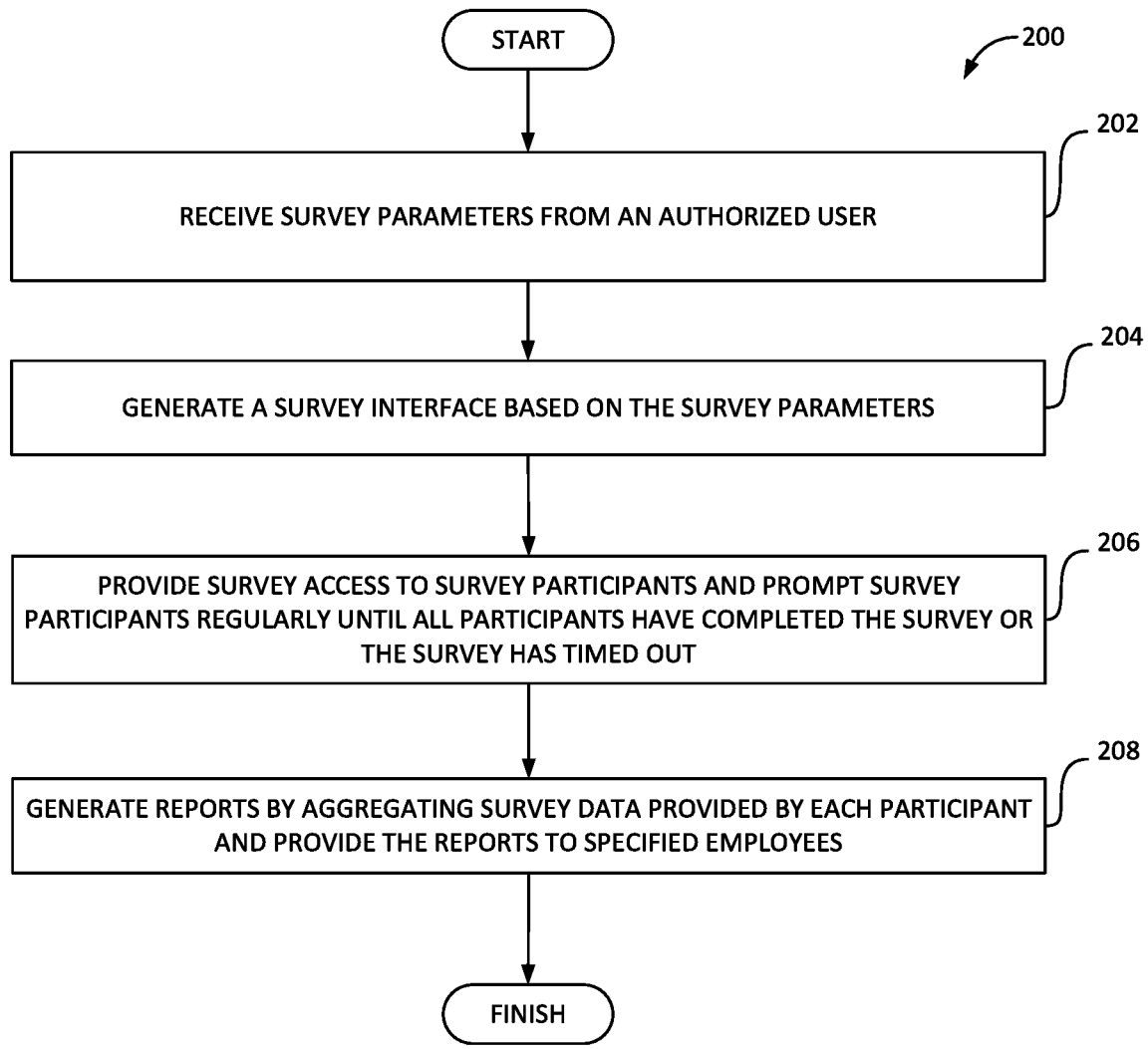
FIG. 2 illustrates a flowchart for a method for generating reports, according to embodiments of the present technology.

FIG. 2 is an example method 200 for generating reports based on and including actionable data analytics. Method 200 may be performed by system 100 to generate reports and the like.

At operation 202, survey parameters are received from an authorized user. Survey parameters may include designation of survey participants such as specific employees, departments, managers and/or those beneath designated managers, etc. Survey parameters may also include timing or scheduling information (e.g., to be processed by scheduling service 114) for performing a survey at specified times or a specified schedule. In some examples, survey parameters can include specified survey questions or formats.

At operation 204, a survey interface is generated based on the received parameters. The survey interface may be multiple pages long and structured for scaling to computer, mobile, smartphone, and other device constraints.

At operation 206, participants (e.g., designated in the survey parameters) are provided access to the survey and can be prompted (e.g., regularly, semi-regularly, scheduled, etc.) to complete the survey until the survey times out (e.g., expires according to a timing parameter provided as a survey parameter). Participants may receive access to the survey via an email, link, text message, etc. provided by, for example, email service 116. For example, a link to the survey may be emailed to each recipient and, when clicked, the link can direct the recipient to a web application accessible via mobile, desktop, smartphone, and various other devices.

At operation 208, the survey data provided by each participant is aggregated and processed into a report and provided to specified employees (e.g., specified by the survey parameters). The generated report may be provided via email (e.g., by email service 116) and can include direct survey responses as well as generated data based on the survey responses such as, for example and without imputing limitation, happiness/satisfaction scores across the whole company, cohesion information, interdepartmental communications guidance, etc.

Figure 3:
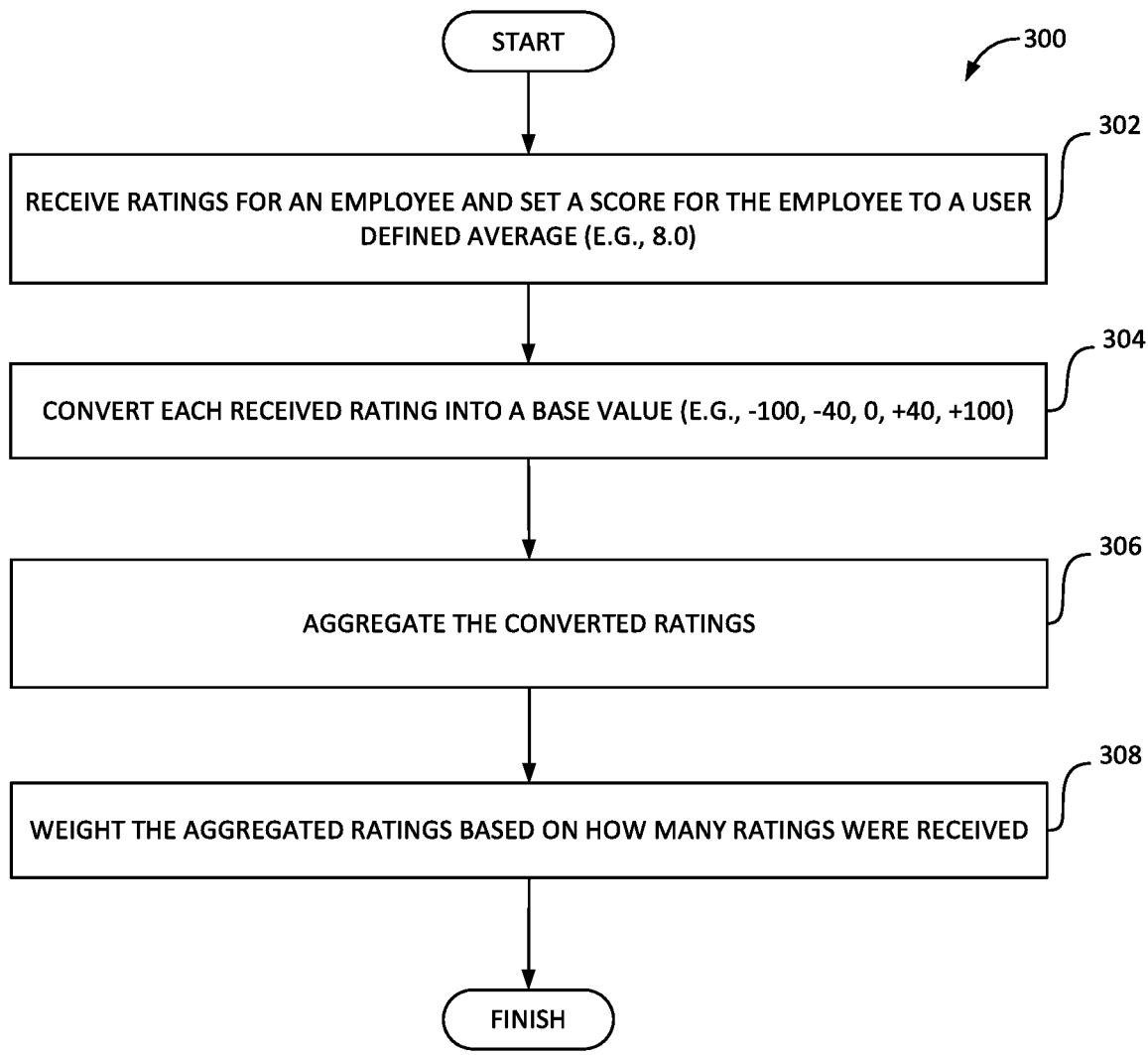
FIG. 3 illustrates a flowchart for a method for generating aggregated ratings for employees, according to embodiments of the present technology.

FIG. 3 is an example method 300 for processing survey response data. In some examples, method 300 can be performed by survey component 108 and the adjust scores can be used by report generation 110.

At operation 302, ratings are received for an employee (e.g., via survey) and a score can be set for the employee to a user defined average. The user defined average may be provided by an authorized user via survey parameters during survey creation (e.g., as discussed above in reference to FIG. 2).

At operation 304, each received rating for the employee is converted into a base value (e.g., −1.0, −0.4, 0, +0.8, +2.0 from a five star system). The converted values base values can be used to more efficiently aggregate or otherwise process the ratings. For example, the converted values may make aggregation methodologies involving summation easier by placing values along a 0-100 and positive to negative scale.

At operation 306, the converted ratings are aggregated. In some examples, aggregation can be accomplished via summation. In some examples, aggregation can be performed according to certain algorithms or averaging (e.g., mean, median, mode, etc.). At operation 308, the aggregated ratings are weighted (e.g., a multiplier is applied) based on how many ratings were received.

Figure 4:
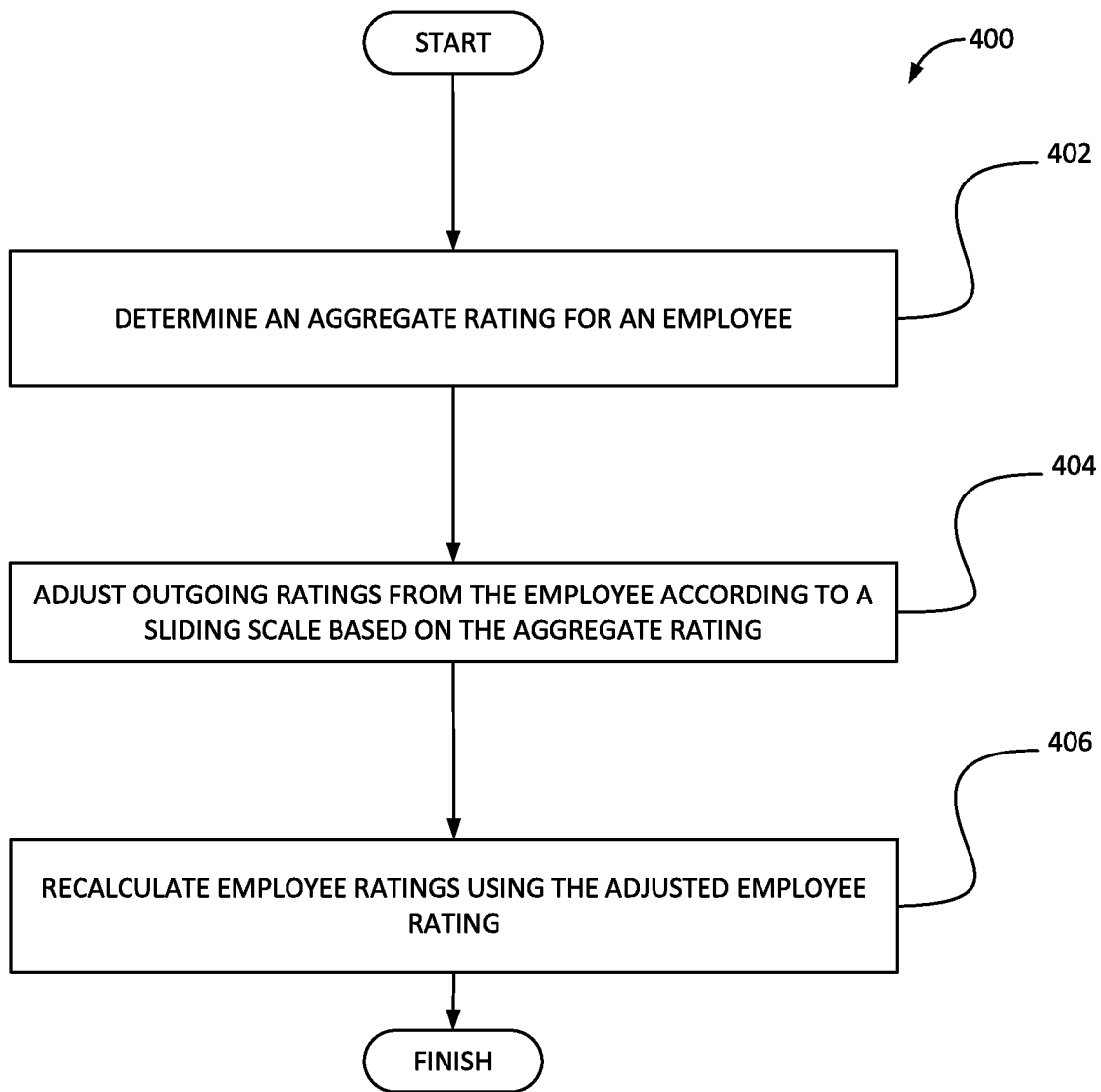
FIG. 4 illustrates a flowchart for a method for adjusting employee ratings, according to embodiments of the present technology.

FIG. 4 is a method 400 for processing ratings for an employee based on weighting considerations. For example, method 400 may be performed in order to take into account company size and/or for varying influence among employees.

At operation 402, an aggregated rating is determined for an employee (e.g., via method 300 discussed above). The aggregated rating is determined based on surveyed coworkers of the employee and response rate.

At operation 404, ratings (e.g., of other employees, or coworkers) made by the employee are adjusted according to a sliding scale based on the respective aggregated rating for said employee. For example, ratings made by an employee with a universally high rating may be weighted to count for double when performing a respective aggregation process. In comparison, ratings made by an employee with a universally minimal rating may be weighted to count for quarter as normal (e.g., weighted by 0.25) when performing a respective aggregation process. Once adjustments have been made for every employee, at operation 406, each adjusted employee ratings may be used to recalculate the employee ratings. As a result, employee influence may be accounted for when performing aggregation of the survey data.

Figure 5:
FIG. 5 illustrates an example survey, according to embodiments of the present technology.

FIG. 5 is an example survey 500. Survey 500 can be performed by a computer, mobile device, and/or smartphone. Survey 500 enables a responder to provide satisfaction information related to a job, management, leadership, compensation, workspace, and the like. Additionally, free comments can be provided. Survey participants can also rate coworkers based on a 1-5 rating of satisfaction working with the respective coworker as well as selection of words from a descriptive word bank.

Figure 6:
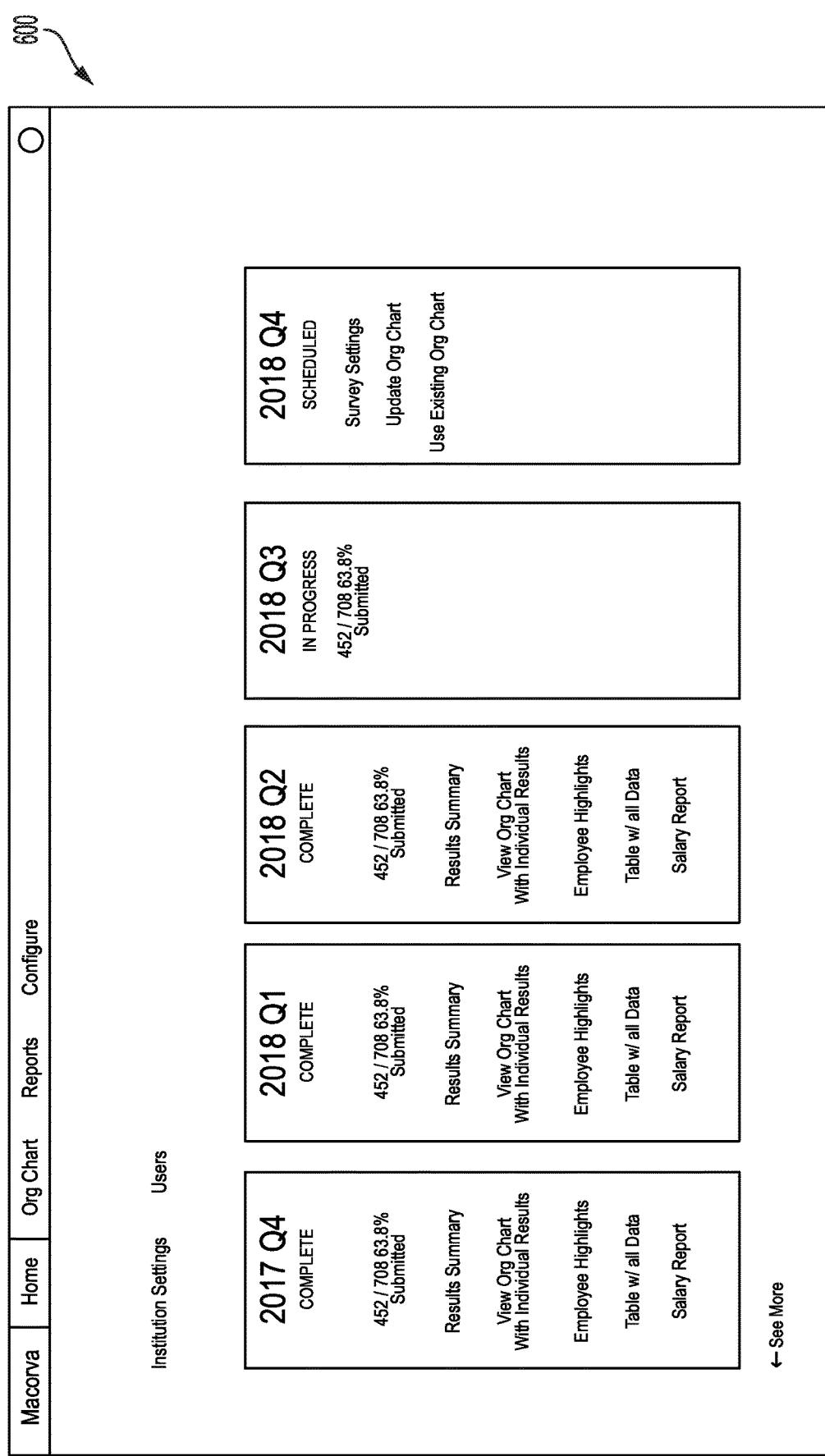
FIG. 6 illustrates an example user interface, according to embodiments of the present technology.

FIG. 6 is an example user page 600 that can provide a user (e.g., an authorized user), who may also be an employee, access to the systems and methods of this disclosure. User page 600 can include a home page, org chart page, reports page, and configuration page. The home page provides an overview of past, current, and planned surveys and includes links to response rate, results summary, detailed org charts, tabular formatted data, and salary reports. Current surveys can be displayed with percentage completed so far. Additionally, planned surveys may include links to survey settings (e.g., to provide or update survey parameters) as well as options to use a current org chart or update the org chart.

FIG. 7A is an example department report interface 700 that can provide a user (e.g., a manager, senior employee, etc.), a view of ratings which have been aggregated and abstracted to a particular department (e.g., marketing, etc.) as a whole. Department report interface 700 can include an inter-department ratings section 710 and a department information section 720.

Inter-department ratings section 710 may include a tabular listing of ratings between other departments and the particular department. Further, a company-wide average rating, both rating the particular department and as rated by the particular department, may be included at the top of the tabular listing. In some examples, inter-department ratings sections can provide a time-comparison view. Here, for example, inter-department ratings section 710 includes ratings for two different years (e.g., to appraise progress, etc.). In effect, inter-department ratings section 710 enables a user to quickly view how other departments, overall, interact with a particular department and so identify which departments collaborate better or worse with each other.

Department information section 720 may include various department information to, for example, contextualize inter-department ratings section 710 and the like. Depart information section 720 may include a tabular view. In some examples, department information section 720 includes, for example and without imputing limitation, department size, engagement, happiness, completion (e.g., survey completion, etc.), and average inter-department rating. Additionally, department information section 720 may include information for multiple time periods (e.g., years, quarters, etc.) as well as an indication of a change in information, or delta, between the time periods.

Figure 7B:
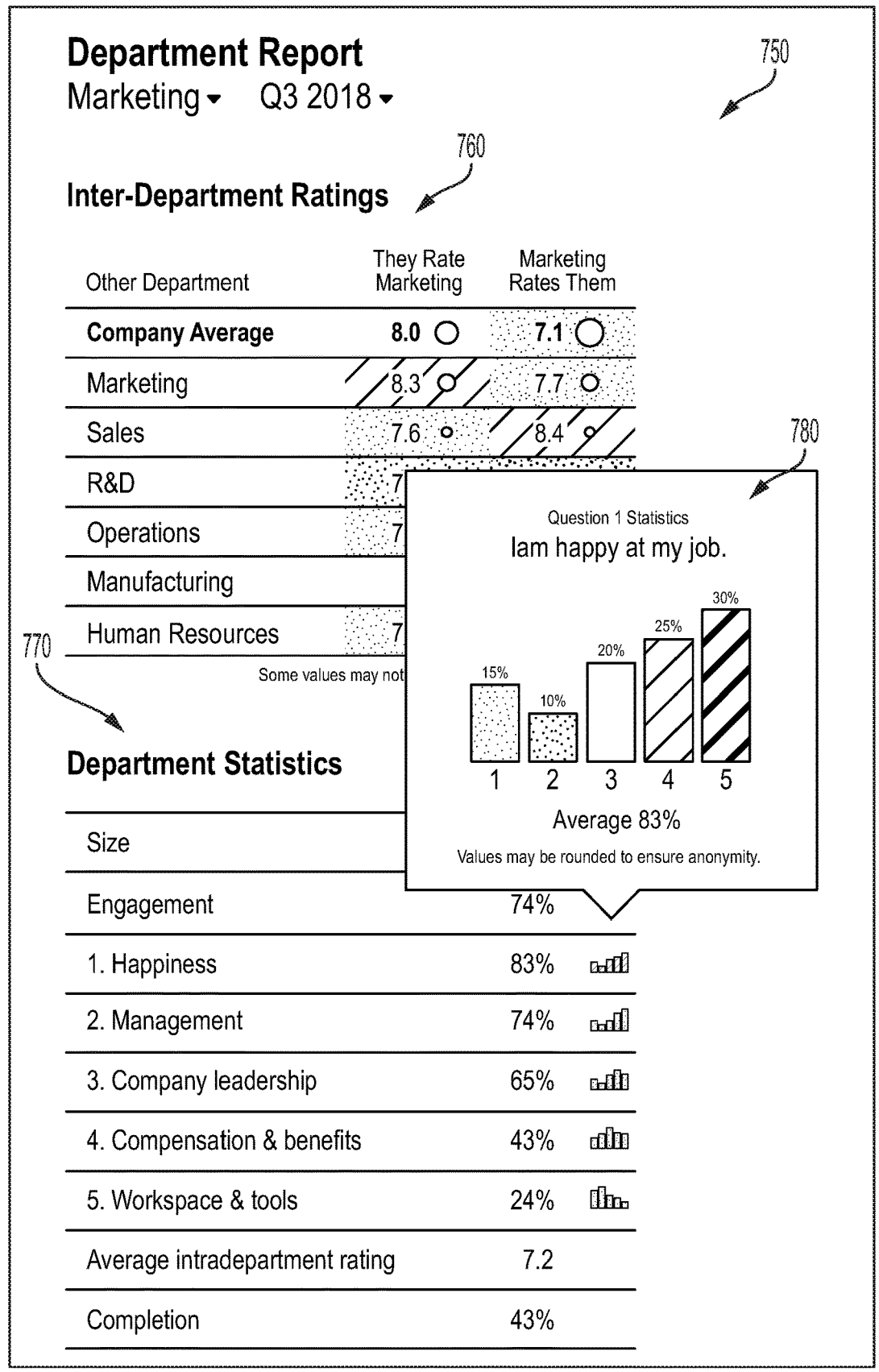

FIG. 7B is an example department report interface 750 that includes data visualizations for intuitive and fast review of department-specific information generated via surveys (e.g., as discussed above). Inter-departments ratings section 760 includes further visual elements (e.g., in comparison to department report interface 700) to indicate response strength and the like through, for example, a circle icon that is sized according to a relationship between the particular department and the department listed for comparison. Further, department information section 770 includes a chart icon indicating that detailed information is available for a particular department statistic (e.g., happiness, management, company leadership, compensation and benefits, workspace and tools, etc.). In some examples, the chart icon may be interacted with to view an expanded graph view 780 which includes a bar chart depicting a spread of responses related to a respective department statistic.

Figure 8:
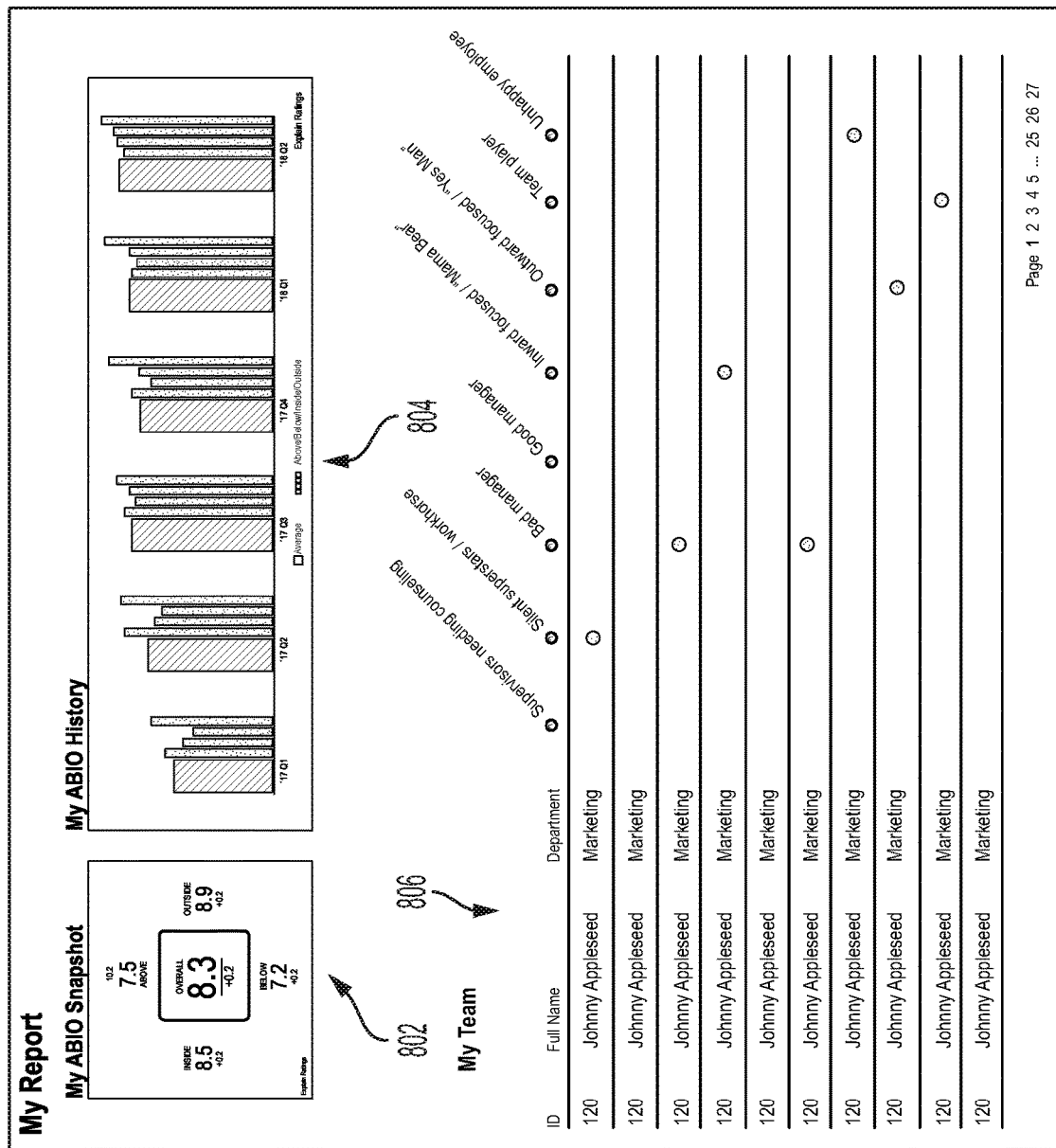
FIG. 8 illustrates an example reporting interface for an individual and team, according to embodiments of the present technology.

FIG. 8 is an example reporting interface 800 for a user to review their own ABIO score history as well as an ABIO composition of a respective team. For example, reporting interface 800 includes an ABIO snapshot 802 providing the user recent ratings information and a resultant ABIO score. An ABIO history 804 provides comparison snapshots of the user ABIO score over multiple time periods. Each comparison snapshot is displayed as a bar chart of each sub-score that makes up the ABIO score for the respective time period. As a result, a user can see changes to the user ABIO score as well as quickly appraise along which dimensions (e.g., above, below, inside, outside, etc.) changes have taken place. Further, a team composition section 806 shows the user which employee types are present on a respective team and how many. The employee types are based on respective ABIO scores for team members, which may be kept unknown to the user in order to maintain anonymity of the data.

FIG. 9 is an example team ABIO report interface 900 for reviewing ABIO information across an entire team for each member of the team. An authorized user (e.g., a team lead, manager, supervisor, etc.) can access team ABIO report interface 900 to review ABIO scores for all members of the team. Team ABIO report interface 900 can include a tabular view 902 in which each row is associated with a particular employee (e.g., team member) and columns provide identification 904, name 906, department 908, an overall ABIO value 910, and individual ABIO component values 912-918.

More particularly, overall ABIO score 910 and individual ABIO components values 912-918 are further broken down to respective scores and sample size used to determine said scores. Overall ABIO value 910 includes an overall ABIO score 910A and respective overall ABIO sample size 910B, Above component value 912 includes an Above score 912A and respective Above sample size 912B, Below component value 914 includes an Below score 914A and respective Below sample size 914B, Inside component value 916 includes an Inside score 916A and respective Inside sample size 916B, and Outside component value 918 includes an Outside score 918A and respective Outside sample size 918B. As can be seen with Below score 914A, where a sample size is insufficient to calculate a rating for an employee (as discussed above), an associated value may be labeled as "insig" or the like to identify that value as uncalculated at the time due to sample size limitations.

Figure 10:
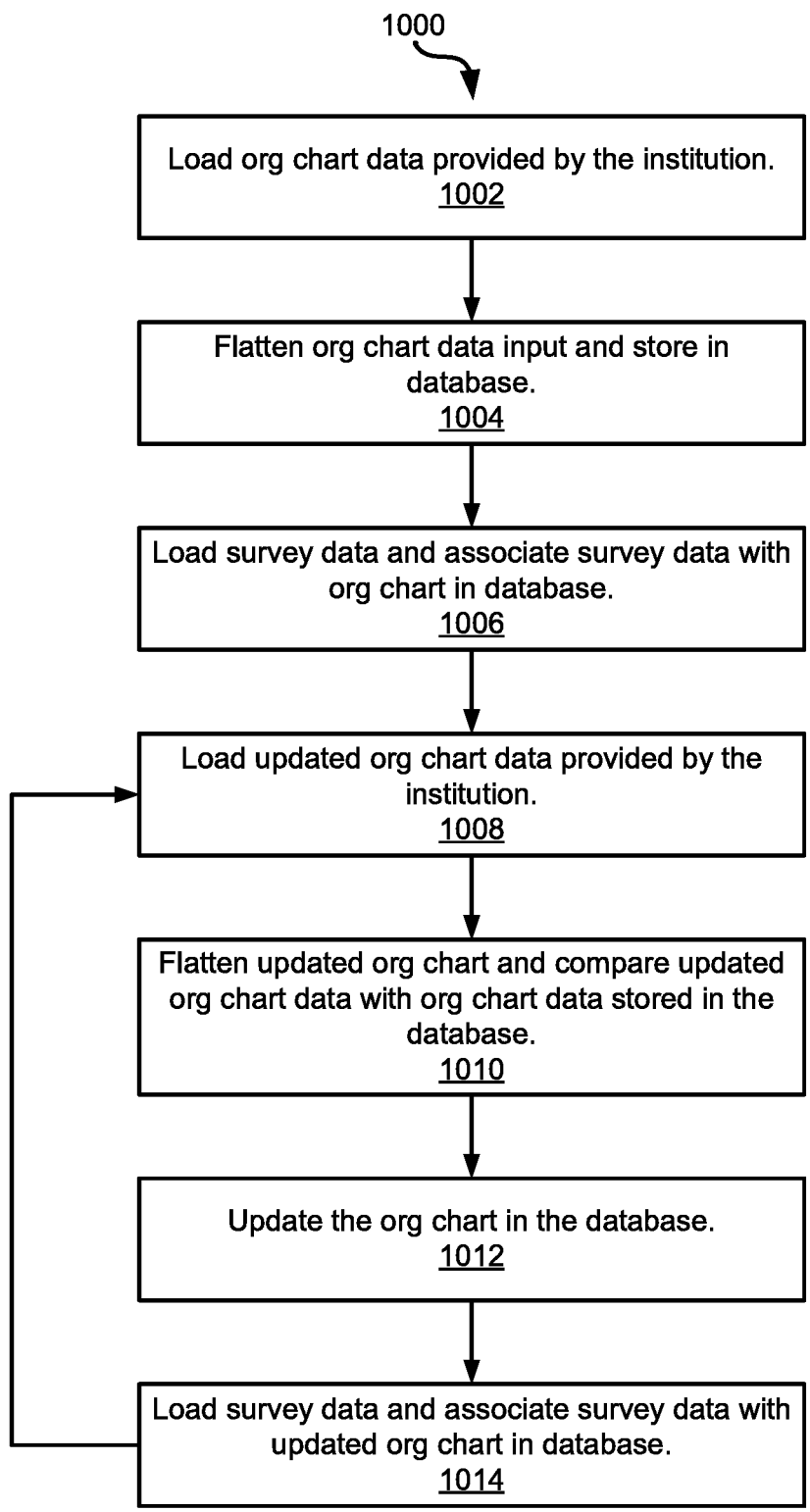
FIG. 10 illustrates a flowchart for a method for associating survey data with organizational chart information, according to embodiments of the present technology.

FIG. 10 is an example method 1000 that may be used to load and update org chart data to be used in the systems and methods discussed herein. In step 1002, the org chart data provided by the institution may be loaded. In some examples, the org chart data is provided by the institution in a tree type data structure.

In step 1004, the org chart data input is flattened and stored in the database. In step 1006, survey data is loaded into the database and associated with the org chart data. For example, the survey data may include survey questions that are separated into different groups, where each group of questions is associated with a different level of the org chart or a different branch of the org chart.

Once the initial org chart is loaded, it could be updated in the database. To update the org chart, the institution may load an updated org chart in step 1008.

In step 1010, this updated org chart is flattened and compared to the org chart currently stored in the database. In step 1012, the org chart stored in the database is updated to match the updated org chart data.

In step 1014, survey data is loaded into the database and associated with the updated org chart. The survey data may be the same as the survey data loaded in step 1006, or it may be different. Steps 1008 to 1014 may be repeated for multiple updates.

Figure 11:
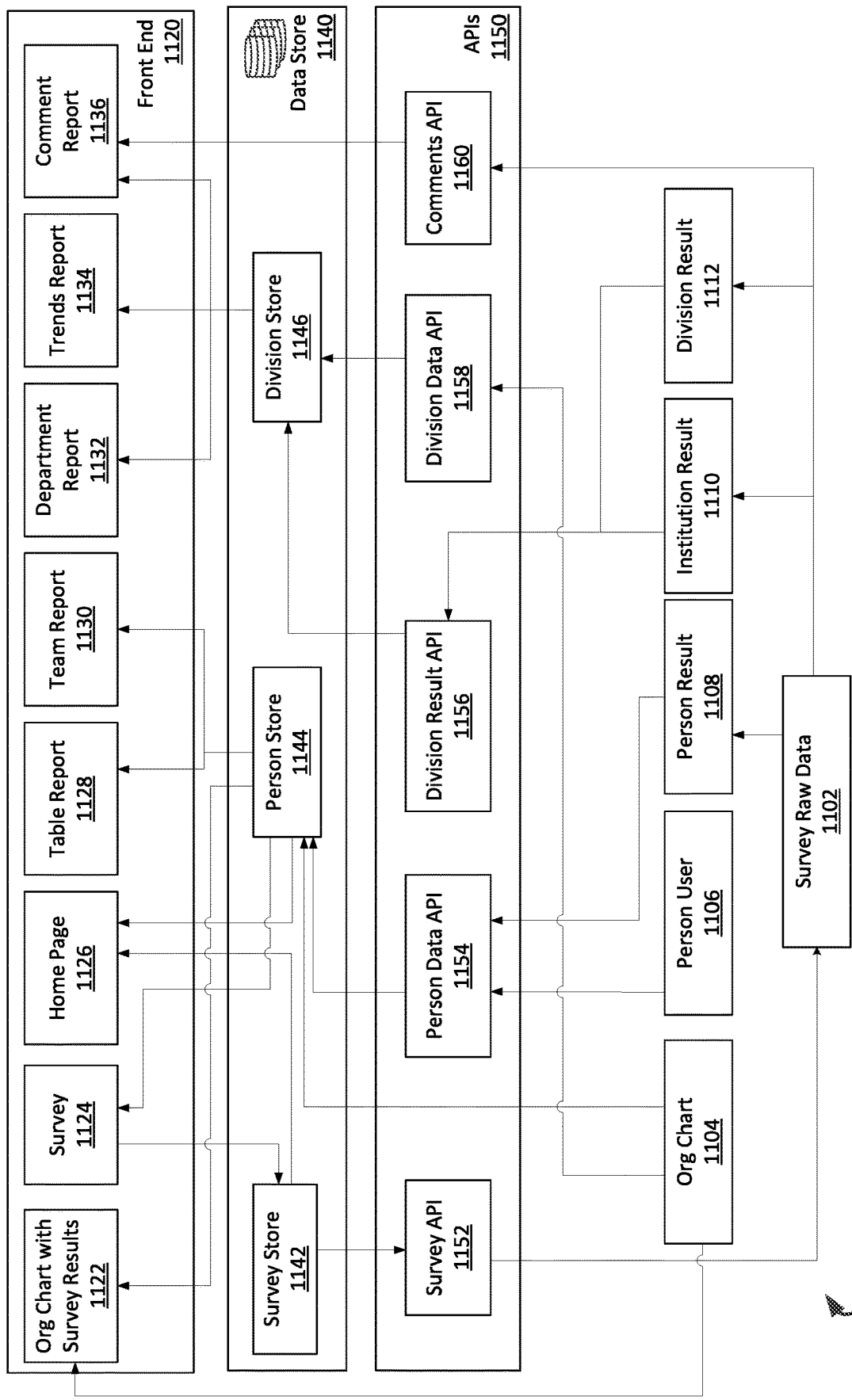
FIG. 11 illustrates an example system architecture, according to embodiments of the present technology.

FIG. 11 is an example system 1100. The example system 1100 comprises a front end 1120, a data store 1140, APIs 1150, and additional data like org chart 1104, person user 1106, and the survey raw data 1102.

The front end 1102 may be used to display data to users. The displayed data may include an org chart with associated survey results 1122, the survey 1124, a home page 1126, a table report 1128, a team report 1130, a department report 1134, and a comment report 1136. The front end 1120 may also be used to receive data input from the user. For example, the user may input responses to the survey 1124 through the front end 1120.

The system 1100 also includes a data store 1140. The data store 1140 may use a cloud storage system, a storage device, or multiple storage devices. The data store 1140 includes a survey store 1142 which stores survey data to be displayed on the front end 1120, a person store 1144 that stores user information and org chart data, and a division store 1146 that stores data related to a division of a respective institution.

The system 1100 includes several different APIs. For example, survey API 1152, person data endpoint 1154, division result API 1156, division data 1158, and comments API 1160. The APIs provide an interface for the various parts of the system 1100 to communicate with each other. For example, once a user inputs survey 1124 results through the front end 1120, the results are stored in survey store 1142.

Data from the survey store 1142 can be written into a database as survey raw data 1102 through the survey API 1152. The APIs 1150 may also be used to retrieve data to be displayed on the front end. For example, the person data API 1154 may be used to store user information 1106 and person survey result 1108 in the person store 1144. The division result API 1156 may be used to store institution result 1110 and division 1112 in the division store 1146. The comments API 1160 may be used to display comments from the survey raw data 1102 to the comment report 1136 of the front end 1120.

Figure 12:
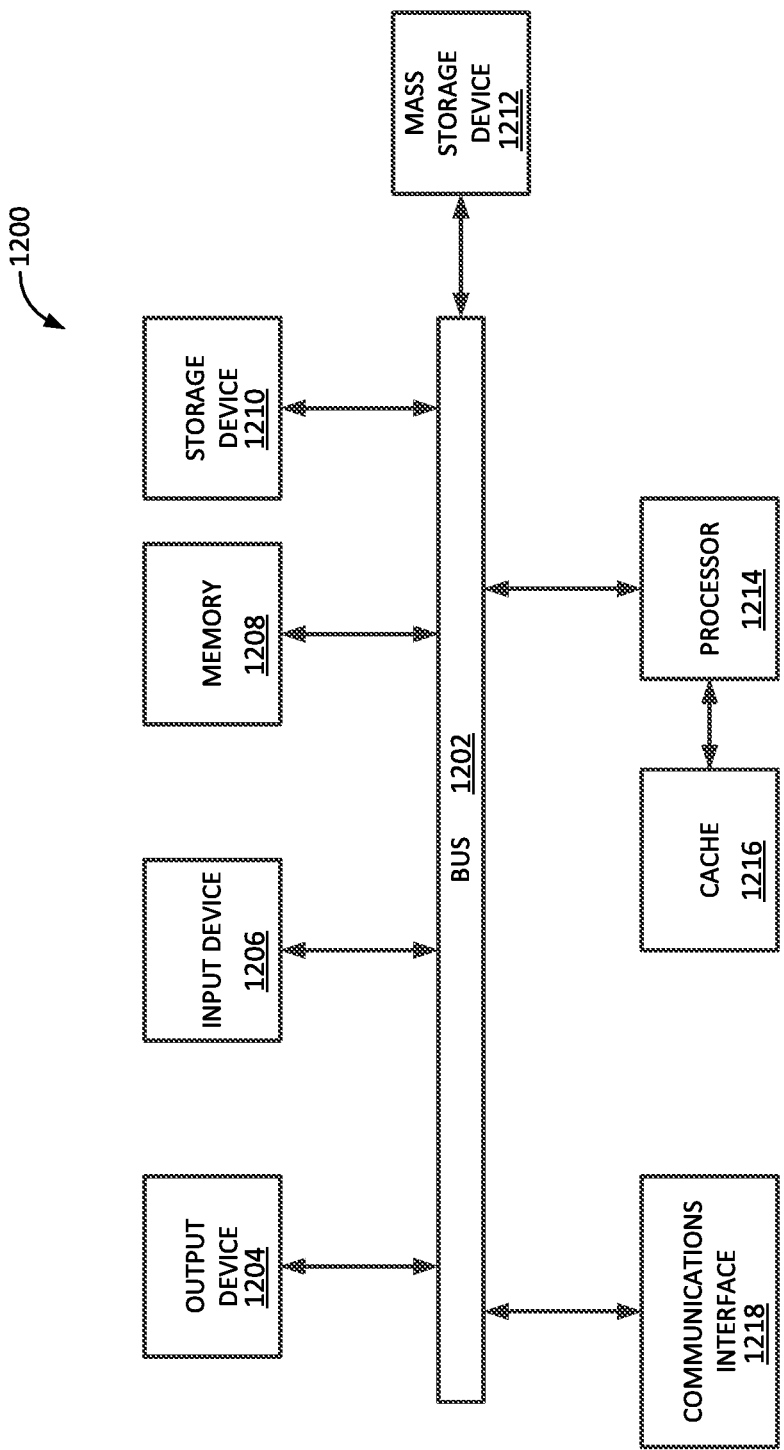
FIG. 12 illustrates an example computing system for performing methods of the present disclosure, according to embodiments of the present technology.

FIG. 12 is an example computing system 1200 that may implement various systems and methods discussed herein. The computer system 1200 includes one or more computing components in communication via a bus 1202. In one implementation, the computing system 1200 includes one or more processors 1214. The processor 1214 can include one or more internal levels of cache 1216 and a bus controller or bus interface unit to direct interaction with the bus 1202. The processor 1214 may specifically implement the various methods discussed herein. Main memory 1208 may include one or more memory cards and a control circuit (not depicted), or other forms of removable memory, and may store various software applications including computer executable instructions, that when run on the processor 1214, implement the methods and systems set out herein. Other forms of memory, such as a storage device 1210 and a mass storage device 1212, may also be included and accessible, by the processor (or processors) 1214 via the bus 1202. The storage device 1210 and mass storage device 1212 can each contain any or all of the methods and systems discussed herein.

The computer system 1200 can further include a communications interface 1218 by way of which the computer system 1200 can connect to networks and receive data useful in executing the methods and system set out herein as well as transmitting information to other devices. The computer system 1200 can also include an input device 1206 by which information is input. Input device 1206 can be a scanner, keyboard, and/or other input devices as will be apparent to a person of ordinary skill in the art. The computer system 1200 can also include an output device 1204 by which information can be output. Output device 1204 can be a monitor, printer, USB, and/or other output devices or ports as will be apparent to a person of ordinary skill in the art.

The system set forth in FIG. 12 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the methods can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer. The computer-readable storage medium may include, but is not limited to, optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for determining employee sentiment ratings, the method comprising:
   receiving, by a computing system, ratings data, the ratings data comprising a plurality of outgoing ratings associated with one or more rated employees, wherein the outgoing ratings are received from one or more rating entities responsive to a survey and at least a portion of the one or more rating entities and the rated employees are the same;
   aggregating, by the computing system, the plurality of outgoing ratings to generate aggregate ratings for the one or more rated employees, wherein for each rated employee the aggregating comprises at least an averaging of the outgoing ratings associated with the rated employee and each corresponding outgoing rating associated with the rated employee;
   based on the aggregate ratings, generating, by the computing system, a set of weight values for the rating entities that are also rated employees, wherein the weight values are based on the aggregate ratings such that rating entities with an above-average aggregate rating are assigned higher weight values and rating entities with a below-average aggregate rating are assigned lower weight values;
   generating, by the computing system, a set of adjusted outgoing ratings by weighting the plurality of outgoing ratings with the set of weight values, such that each outgoing rating from a given rating entity is weighted by the weight value generated for the given rating entity;
   aggregating, by the computing system, the set of adjusted outgoing ratings to generate adjusted ratings for the one or more rated employees;
   generating, by the computing system, a report based on the generated adjusted ratings and at least one previous adjusted ratings;
   displaying, by the computing system, a navigable interface comprising the generated report, the navigable interface accessible to an authorized user, the navigable interface including categories of department statistics and corresponding icons;
   detecting, by the computing system, an interaction on the navigable interface with one of the icons in the generating report;
   displaying, by the computing system, in response to the detected interaction with the one of the icons, a sub-window within and layered over the generated report, the sub-window including additional information related to the category of department statistic that corresponds to the one of the icons.

2. The method of claim 1, further comprising:
   receiving, by the computing system, an organizational (org) chart;
   visually associating one or more portions of the org chart with the generated adjusted ratings; and
   wherein the generated navigable interface further comprises the org chart.

3. The method of claim 2, further comprising:
   receiving, by the computing system, survey parameters, the survey parameters identifying the one or more employees to survey;
   identifying, by the computing system, a mismatch between the org chart and the identified one or more parameters, the mismatch comprising one of an employee not included in the org chart or an employee of the org chart not included among the identified one or more employees; and
   prompting, by the computing system, the authorized user to specify a reason for the mismatch.

4. The method of claim 1, further comprising:
   generating, by the computing system, respective scores for each of the one or more employees, each respective score based on one or more of ratings received from coworkers organizationally above a respective employee of the one or more employees, ratings received from coworkers organizationally below the respective employee, ratings received from coworkers within a shared department of the respective employee, or ratings received from coworkers in different departments than that of the respective employee; and
   categorizing, by the computing system, the one or more employees based on the respective scores;
   wherein the navigable interface further comprises one of the respective scores or the categorized one or more employees.

5. The method of claim 1, further comprising:
   grouping, by the computing system, the adjusted ratings data into department groups;
   aggregating, by the computing system, the grouped adjusted ratings data based on the department groups; and
   generating, by the computing system, inter-departmental data based on the aggregated grouped adjusted ratings data;
   wherein the navigable interface further comprises the inter-departmental data.

6. The method of claim 1, further comprising:
   generating, by the computing system, a projected performance for the one or more employees based on the adjusted ratings.

7. The method of claim 1, wherein aggregating, by the computing system, the set of adjusted outgoing ratings for the one or more rated employees further comprises:

determining, by the computing system, a weighted average of the set of adjusted outgoing ratings for the one or more rated employees, wherein the weighted average is determined using a weighting score based on a number of adjusted outgoing ratings within the set.

8. A system for determining employee sentiment ratings, the system comprising:

one or more processors; and
a memory comprising instructions for the one or more processors to:
receive ratings data, the ratings data comprising a plurality of outgoing ratings associated with one or more rated employees, wherein the outgoing ratings are received from one or more rating entities responsive to a survey and at least a portion of the one or more rating entities and the rated employees are the same;
aggregate the plurality of outgoing ratings to generate aggregate ratings for the one or more rated employees, wherein for each rated employee the aggregating comprises at least an averaging of the outgoing ratings associated with the rated employee and each corresponding outgoing rating associated with the rated employee;
generate, based on the aggregate ratings, a set of weight values for the rating entities that are also rated employees, wherein the weight values are based on the aggregate ratings such that rating entities with an above-average aggregate rating are assigned higher weight values and rating entities with a below-average aggregate rating are assigned lower weight values;
generate a set of adjusted outgoing ratings by weighting the plurality of outgoing ratings with the set of weight values, such that each outgoing rating from a given rating entity is weighted by the weight value generated for the given rating entity;
aggregate the set of adjusted outgoing ratings to generate adjusted ratings for the one or more rated employees;
generate a report based on the generated adjusted ratings and at least one previous adjusted ratings;
display a navigable interface comprising the generated report, the navigable interface accessible to an authorized user, the navigable interface including categories of department statistics and corresponding icons;
detect an interaction on the navigable interface with one of the icons in the generating report;
display, in response to the detected interaction with the one of the icons, a sub-window within and layered over the generated report, the sub-window including additional information related to the category of department statistic that corresponds to the one of the icons.

9. The system of claim 8, wherein the memory further comprises instructions to:
receive an organizational (org) chart;
visually associate one or more portions of the org chart with the generated adjusted ratings; and
wherein the generated navigable interface further comprises the org chart.

10. The system of claim 9, wherein the memory further comprises instructions to:

receive survey parameters, the survey parameters identifying the one or more employees to survey;
identify a mismatch between the org chart and the identified one or more parameters, the mismatch comprising one of an employee not included in the org chart or an employee of the org chart not included among the identified one or more employees; and
prompt the authorized user to specify a reason for the mismatch.

11. The system of claim 8, wherein the memory further comprises instructions to:
generate respective scores for each of the one or more employees, each respective score based on one or more of ratings received from coworkers organizationally above a respective employee of the one or more employees, ratings received from coworkers organizationally below the respective employee, ratings received from coworkers within a shared department of the respective employee, or ratings received from coworkers in different departments than that of the respective employee; and
categorize the one or more employees based on the respective scores;
wherein the navigable interface further comprises one of the respective scores or the categorized one or more employees.

12. The system of claim 8, wherein the memory further comprises instructions to:
group the adjusted ratings data into department groups;
aggregate the grouped adjusted ratings data based on the department groups; and
generate inter-departmental data based on the aggregated grouped adjusted ratings data;
wherein the navigable interface further comprises the inter-departmental data.

13. The system of claim 8, wherein the memory further comprises instructions to:
generate projected performance for the one or more employees based on the adjusted ratings.

14. The system of claim 8, wherein the memory comprises further instructions to:
aggregate the set of adjusted outgoing ratings by determining a weighted average of the set of adjusted outgoing ratings for the one or more rated employees, wherein the weighted average is determined using a weighting score based on a number of adjusted outgoing ratings within the set.

15. A non-transitory computer readable medium storing instructions that, when executed by one or processors, cause the one or more processors to:
receive ratings data, the ratings data comprising a plurality of outgoing ratings associated with one or more rated employees, wherein the outgoing ratings are received from one or more rating entities responsive to a survey and at least a portion of the one or more rating entities and the rated employees are the same;
aggregate the plurality of outgoing ratings to generate aggregate ratings for the one or more rated employees, wherein for each rated employee the aggregating comprises at least an averaging of the outgoing ratings associated with the rated employee and each corresponding outgoing rating associated with the rated employee;
generate, based on the aggregate ratings, a set of weight values for the rating entities that are also rated employees, wherein the weight values are based on the aggregate ratings such that rating entities with an above-average aggregate rating are assigned higher weight values and rating entities with a below-average aggregate rating are assigned lower weight values;

generate a set of adjusted outgoing ratings by weighting the plurality of outgoing ratings with the set of weight values, such that each outgoing rating from a given rating entity is weighted by the weight value generated for the given rating entity;

aggregate the set of adjusted outgoing ratings to generate adjusted ratings for the one or more rated employees;

generate a report based on the generated adjusted ratings and at least one previous adjusted ratings; and display a navigable interface comprising the generated report, the navigable interface accessible to an authorized user, the navigable interface including categories of department statistics and corresponding icons;

detect an interaction on the navigable interface with one of the icons in the generating report;

display, in response to the detected interaction with the one of the icons, a sub-window within and layered over the generated report, the sub-window including additional information related to the category of department statistic that corresponds to the one of the icons.

16. The non-transitory computer readable medium of claim 15, further storing instructions to:
receive an organizational (org) chart;
visually associate one or more portions of the org chart with the generated adjusted ratings; and
wherein the generated navigable interface further comprises the org chart.

17. The non-transitory computer readable medium of claim 16, further storing instructions to:
receive survey parameters, the survey parameters identifying the one or more employees to survey;
identify a mismatch between the org chart and the identified one or more parameters, the mismatch comprising one of an employee not included in the org chart or an employee of the org chart not included among the identified one or more employees; and
prompt the authorized user to specify a reason for the mismatch.

18. The non-transitory computer readable medium of claim 15, further storing instructions to:
generate respective scores for each of the one or more employees, each respective score based on one or more of ratings received from coworkers organizationally above a respective employee of the one or more employees, ratings received from coworkers organizationally below the respective employee, ratings received from coworkers within a shared department of the respective employee, or ratings received from coworkers in different departments than that of the respective employee; and
categorize the one or more employees based on the respective scores;
wherein the navigable interface further comprises one of the respective scores or the categorized one or more employees.

19. The non-transitory computer readable medium of claim 15, further storing instructions to:
group the adjusted ratings data into department groups;
aggregate the grouped adjusted ratings data based on the department groups; and
generate inter-departmental data based on the aggregated grouped adjusted ratings data;
wherein the navigable interface further comprises the inter-departmental data.

20. The non-transitory computer readable medium of claim 15, further storing instructions to:
aggregate the set of adjusted outgoing ratings by determining a weighted average of the set of adjusted outgoing ratings for the one or more rated employees, wherein the weighted average is determined using a weighting score based on a number of adjusted outgoing ratings within the set.

* * * * *